(12) United States Patent
Fukaya

(10) Patent No.: US 9,825,466 B2
(45) Date of Patent: Nov. 21, 2017

(54) POWER SUPPLY DEVICE, ELECTRONIC DEVICE, CONTROL METHOD, AND RECORDING MEDIUM

(71) Applicant: CANON KABUSHIKI KAISHA, Tokyo (JP)

(72) Inventor: Yudai Fukaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 13/753,345

(22) Filed: Jan. 29, 2013

(65) Prior Publication Data

US 2013/0193756 A1 Aug. 1, 2013

(30) Foreign Application Priority Data

Feb. 1, 2012 (JP) ................. 2012-020012

(51) Int. Cl.
    *H02J 4/00* (2006.01)
    *H02J 17/00* (2006.01)
    *H02J 7/02* (2016.01)
    *H02J 7/00* (2006.01)
    *H02J 5/00* (2016.01)
    *H02J 7/04* (2006.01)

(52) U.S. Cl.
    CPC ............. *H02J 4/00* (2013.01); *H02J 7/0036* (2013.01); *H02J 7/025* (2013.01); *H02J 17/00* (2013.01); *H02J 5/005* (2013.01); *H02J 7/044* (2013.01); *H02J 2007/0062* (2013.01); *H02J 2007/0096* (2013.01); *Y10T 307/391* (2015.04); *Y10T 307/696* (2015.04)

(58) Field of Classification Search
    CPC .. H02J 4/00; H02J 7/0036; H02J 7/025; H02J 17/00; H02J 7/044; H02J 2007/0096; H02J 2007/0062; H02J 5/005; Y10T 307/391; Y10T 307/696
    USPC .......................................... 307/29
    See application file for complete search history.

(56) References Cited

U.S. PATENT DOCUMENTS

| 8,390,255 | B1* | 3/2013 | Fathollahi | ............. H02J 7/0045 206/308.3 |
| 2003/0139207 | A1* | 7/2003 | Yamazaki | ............... H04L 12/10 455/573 |
| 2005/0280511 | A1* | 12/2005 | Yokoyama | ............. G06K 19/07 340/10.5 |
| 2007/0103110 | A1* | 5/2007 | Sagoo | ..................... H02J 7/025 320/109 |
| 2007/0210917 | A1* | 9/2007 | Collins, Jr. | ............ A61B 5/447 340/539.1 |

(Continued)

FOREIGN PATENT DOCUMENTS

| JP | 2001-069236 A | 3/2001 |
| JP | 2003-274569 A | 9/2003 |

(Continued)

*Primary Examiner* — Jared Fureman
*Assistant Examiner* — Emmanuel R Dominique
(74) *Attorney, Agent, or Firm* — Canon U.S.A., Inc. IP Division

(57) ABSTRACT

A power supply device includes a power supply unit that wirelessly supplies power, a communication unit that communicates with an electronic device, and a control unit that controls the communication unit to transmit a predetermined data to the electronic device based on whether or not the electronic device is connected to an external device supplying power to the electronic device.

20 Claims, 9 Drawing Sheets

(56) References Cited

U.S. PATENT DOCUMENTS

| | | | |
|---|---|---|---|
| 2010/0013431 A1* | 1/2010 | Liu | G06F 1/1632 |
| | | | 320/108 |
| 2010/0153594 A1 | 6/2010 | Nakayama | |
| 2010/0225272 A1* | 9/2010 | Kirby | H04B 5/00 |
| | | | 320/108 |
| 2011/0043163 A1* | 2/2011 | Baarman | H02J 5/005 |
| | | | 320/108 |
| 2011/0199041 A1* | 8/2011 | Yang | H01M 10/46 |
| | | | 320/101 |
| 2011/0260532 A1 | 10/2011 | Tanabe | |
| 2011/0287726 A1* | 11/2011 | Huang | H04B 1/3883 |
| | | | 455/90.3 |
| 2012/0098484 A1* | 4/2012 | Cheng | H01F 38/14 |
| | | | 320/108 |
| 2013/0069431 A1* | 3/2013 | Tseng | H02J 7/0044 |
| | | | 307/43 |
| 2013/0117552 A1* | 5/2013 | Kim | H04M 19/047 |
| | | | 713/100 |

FOREIGN PATENT DOCUMENTS

| | | |
|---|---|---|
| JP | 2006-352255 A | 12/2006 |
| JP | 2008-067532 A | 3/2008 |
| JP | 2010-140269 A | 6/2010 |
| JP | 2010-288442 A | 12/2010 |
| JP | 2011-015548 A | 1/2011 |

\* cited by examiner

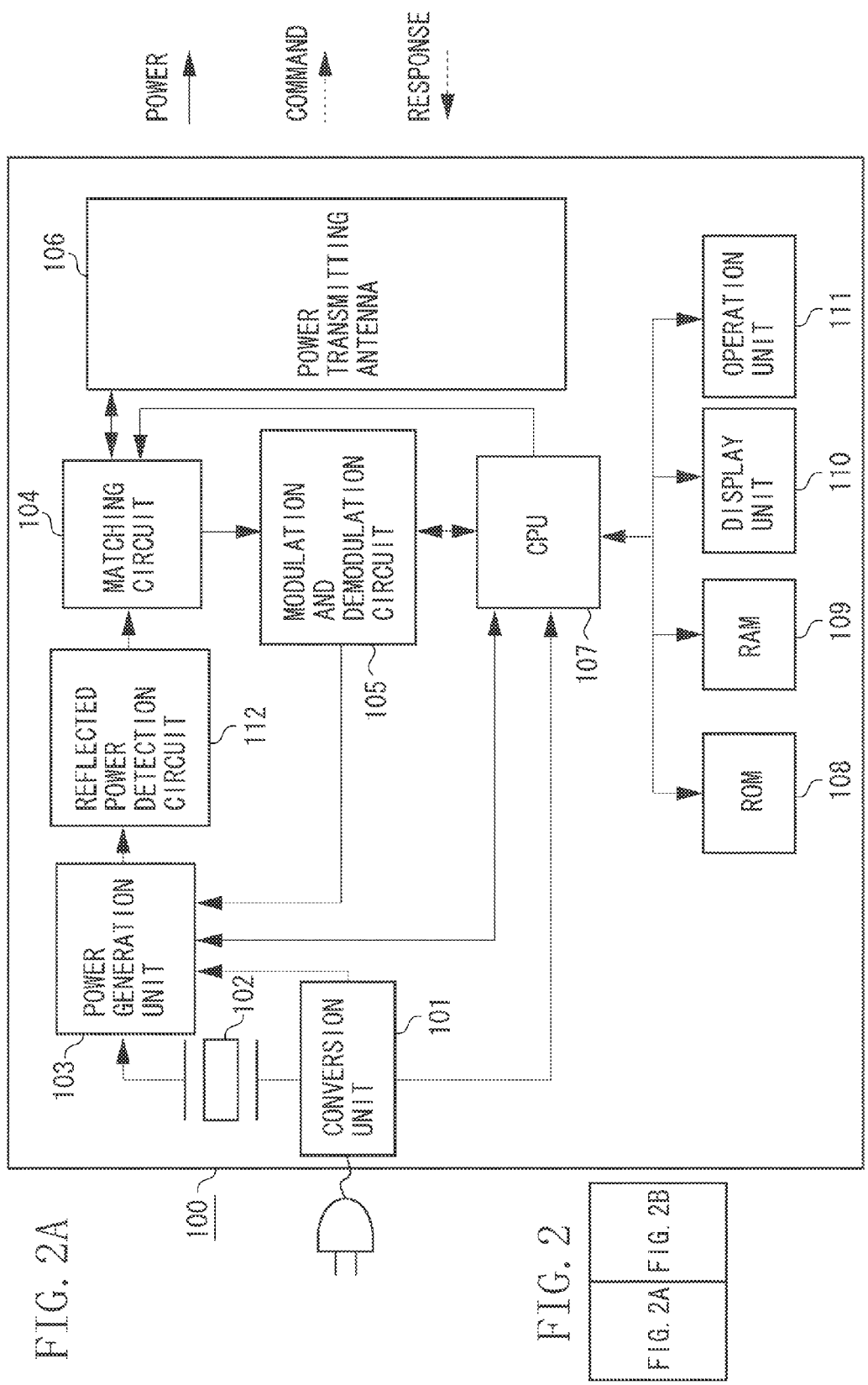

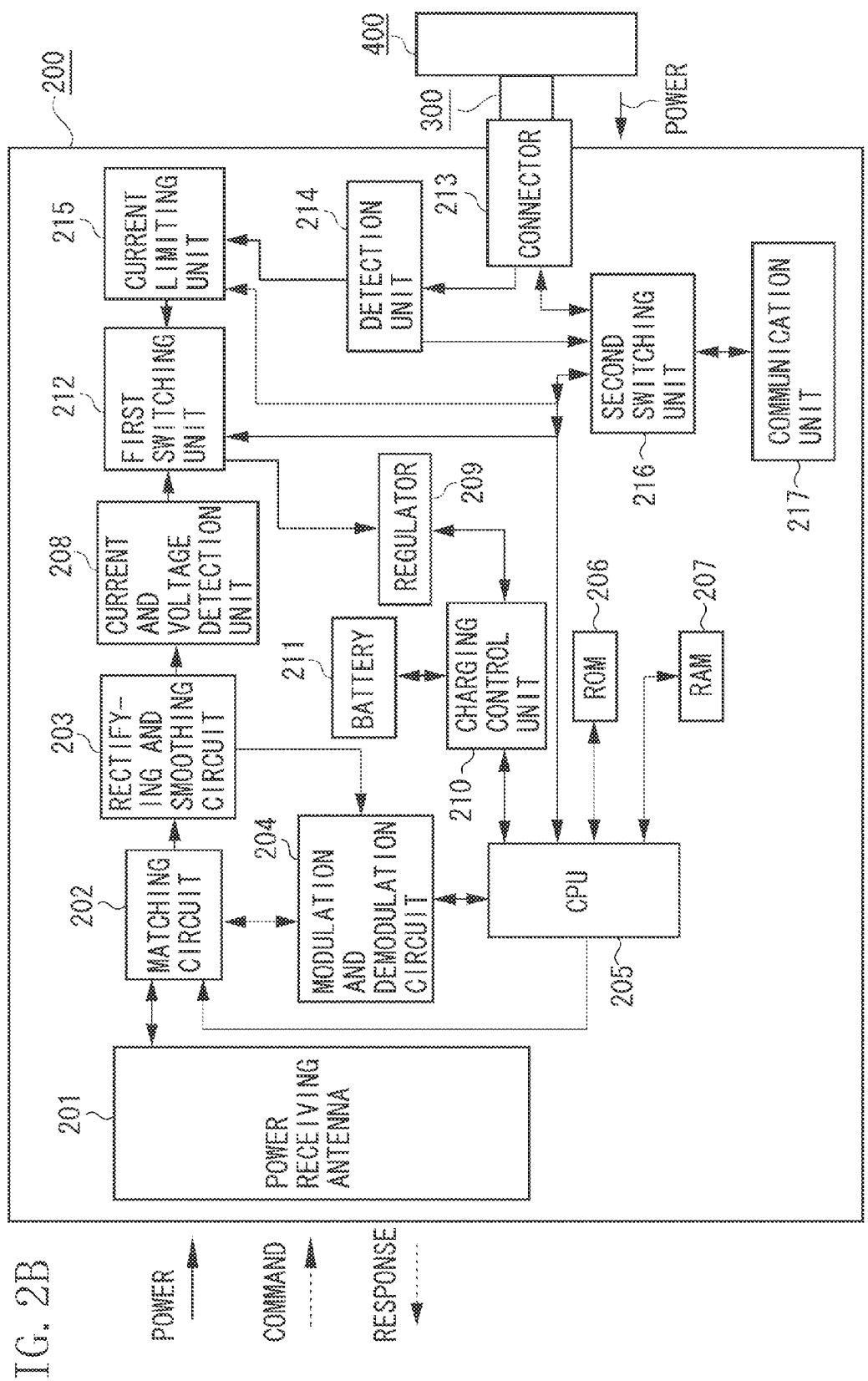

POWER SUPPLY DEVICE, ELECTRONIC DEVICE, CONTROL METHOD, AND RECORDING MEDIUM

BACKGROUND OF THE INVENTION

Field of the Invention

The present invention relates to a power supply device for wirelessly supplying the power, a control method, an electronic device, and a recording medium.

Description of the Related Art

In recent years, there has been a power supply system which is known to include a battery charger having a primary coil for wirelessly outputting the power without connector connection, and a mobile phone having a secondary coil for wirelessly receiving the power supplied from the battery charger.

Japanese Patent Application Laid-Open No. 2008-67532 discusses a mobile phone with which the power is supplied from an alternating current (AC) adapter when it is connected with the AC adapter or from a battery charger when it is inserted into the battery charger.

Conventionally, which of the AC adapter and the battery charger the mobile phone should receive the power from has not been taken into consideration in a case where the mobile phone is connected with the AC adapter and inserted into the battery charger.

There has been a case where excessive power is supplied to the mobile phone if the mobile phone receives the power from the AC adapter and the battery charger. To prevent such a situation, it has been necessary to select an apparatus capable of supplying suitable power to a mobile phone and then supply the power to the mobile phone with the selected apparatus.

The present invention relates to a technique for selecting an apparatus capable of supplying suitable power to an electronic device.

SUMMARY OF THE INVENTION

According to an aspect of the present invention, there is provided a power supply device including a power supply unit that wirelessly supplies power, a communication unit that communicates with an electronic device, and a control unit that controls the communication unit to transmit predetermined data to the electronic device based on whether or not the electronic device and an external device are connected, wherein the predetermined data includes one of first data and a second data, the first data is used for causing the electronic device to receive power from the external device, and the second data is used for causing the electronic device to receive power from the power supply device, and wherein the external device includes a device for supplying power to the electronic device.

According to another aspect of the present invention, there is provided an electronic device including a connection unit that connects to an external device, a power receiving unit that wirelessly receives power from a power supply device, a communication unit that communicates with the power supply device, and a control unit that controls the communication unit so as to transmit predetermined information to the power supply device, wherein the predetermined information indicates whether or not the connection unit and the external device are connected, and wherein the external device includes a device for supplying power to the electronic device via the connection unit.

According to yet another aspect of the present invention, there is provided a method for controlling a power supply device including wirelessly supplying power, communicating with an electronic device, and transmitting predetermined data to the electronic device based on whether or not the electronic device and an external device are connected, wherein the predetermined data includes one of first data and a second data, the first data is used for causing the electronic device to receive power from the external device, and the second data is used for causing the electronic device to receive power from the power supply device, and wherein the external device includes a device for supplying power to the electronic device.

According to yet another aspect of the present invention, there is provided a method for controlling an electronic device including a connection unit that connects to an external device. The method including wirelessly receiving power, communicating with a power supply device, and transmitting predetermined information to the power supply device, wherein the predetermined information indicates whether or not a connection unit and an external device are connected, and wherein the external device includes an device for supplying power to the electronic device via the connection unit.

According to yet another aspect of the present invention, there is provided a recording medium recording a program for causing a computer to execute a method for controlling a power supply device. The method includes wirelessly supplying power, communicating with an electronic device; and transmitting predetermined data to the electronic device based on whether or not the electronic device and an external device are connected, wherein the predetermined data includes one of first data and a second data, the first data is used for causing the electronic device to receive power from the external device, and the second data is used for causing the electronic device to receive power from the power supply device, and wherein the external device includes a device for supplying power to the electronic device.

According to yet another aspect of the present invention, there is provided a recording medium recording a program for causing a computer to execute a method for controlling an electronic device including a connection unit that connects to an external device. The method includes wirelessly receiving power, communicating with a power supply device, and transmitting predetermined information to the power supply device, wherein the predetermined information indicates whether or not the connection unit and an external device are connected, and wherein the external device includes a device for supplying power to the electronic device via the connection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 (including FIGS. 2A and 2B) is an example of a block diagram illustrating the power supply system according to the first exemplary embodiment.

DESCRIPTION OF THE EMBODIMENTS

Various exemplary embodiments, features, and aspects of the invention will be described in detail below with reference to the drawings.

A first exemplary embodiment of the present invention will be described in detail below with reference to the accompanying drawings. A power supply system according to the first exemplary embodiment includes a power supply apparatus 100 and an electronic device 200, as illustrated in FIG. 1.

With the power supply system according to the first exemplary embodiment, when the power supply apparatus 100 and the electronic device 200 exist within a predetermined range, the power supply apparatus 100 wirelessly supplies the power to the electronic device 200. When the power supply apparatus 100 and the electronic device 200 exist within the predetermined range, the electronic device 200 wirelessly receives the power output from the power supply apparatus 100. When the power supply apparatus 100 and the electronic device 200 do not exist within the predetermined range, the electronic device 200 cannot receive the power from the power supply apparatus 100. The predetermined range is also a range within which the power supply apparatus 100 and the electronic device 200 can communicate with each other. The power supply apparatus 100 can also wirelessly supply the power in parallel to a plurality of electronic devices.

Figure 1:
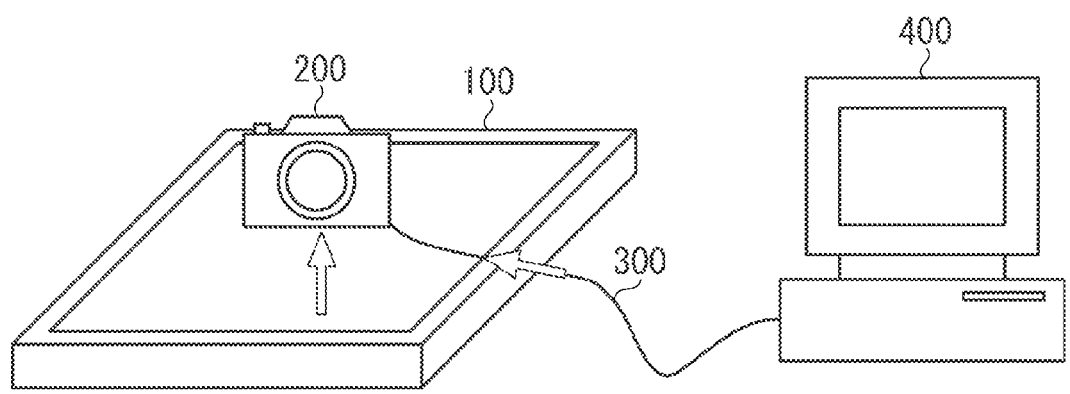
FIG. 1 illustrates an example of a power supply system according to a first exemplary embodiment.

The electronic device 200 illustrated in FIG. 1 is supplied from an external apparatus 400 via a cable 300. In this case, the electronic device 200 is supplied power by wireless from the power supply apparatus 100. The first exemplary embodiment will be described below on the premise that the cable 300 is a predetermined interface conforming to the Universal Serial Bus (USB) standard.

The electronic devices 200 may be an imaging apparatus such as a camera, or a reproducing apparatus for reproducing audio and video data. The electronic device 200 may be a mobile device such as a mobile phone or smart phone. The electronic device 200 may also be a battery pack including a battery 211.

The electronic device 200 may also be a car-like apparatus which is driven by the power supplied from the power supply apparatus 100. The electronic device 200 may also be an apparatus for receiving television broadcasting, a display for displaying video data, or a personal computer. The electronic device 200 may be an apparatus which operates on the power supplied from the power supply apparatus 100 even if the battery 211 is not attached to the electronic device 200.

The external apparatus 400 is to be, for example, a personal computer or a television.

FIG. 2 (including FIGS. 2A and 2B) is a block diagram illustrating the power supply system according to the first exemplary embodiment. The power supply apparatus 100 includes a conversion unit 101, an oscillator 102, a power generation unit 103, a matching circuit 104, a modulation and demodulation circuit 105, a power transmitting antenna 106, a central processing unit (CPU) 107, a read-only memory (ROM) 108, a random access memory (RAM) 109, a display unit 110, an operation unit 111, and a reflected power detection circuit 112, as illustrated in FIG. 2.

When an AC power source (not illustrated) and the power supply apparatus 100 are connected, the conversion unit 101 converts the AC power supplied from the AC power source (not illustrated) into the direct current (DC) power and then supplies the converted DC power to the power supply apparatus 100.

The oscillator 102 oscillates a frequency to be used to control the power generation unit 103 to convert the power supplied from the conversion unit 101 into the power corresponding to a target value set by the CPU 107. The oscillator 102 may be, for example, a crystal resonator.

Based on the power supplied from the conversion unit 101 and the frequency oscillated by the oscillator 102, the power generation unit 103 generates the power to be output to the outside via the power transmitting antenna 106. The power generation unit 103 includes a field effect transistor (FET) and controls a current flowing between source and drain terminals of the FET according to the frequency oscillated by the oscillator 102 to generate the power to be output to the outside. The power generated by the power generation unit 103 is supplied to the matching circuit 104 via the reflected power detection circuit 112. The power generated by the power generation unit 103 includes first power and second power.

The first power is supplied to the electronic device 200 to enable the power supply apparatus 100 to perform wireless communication with the electronic device 200. The second power is supplied to the electronic device 200 when the power supply apparatus 100 supplies the power to the electronic device 200. For example, the first power is 1 W or less and the second power is 2 W to 10 W. The second power may be 10 W or higher. The first power is to be lower than the second power. The first power is not limited to the power equal to or less than 1 W as long as it is used by the power supply apparatus 100 to perform wireless communication.

When the power supply apparatus 100 is supplying the first power to the electronic device 200, the power supply apparatus 100 can perform wireless communication conforming to the Near Field Communication (NFC) standard with the electronic device 200 via the power transmitting antenna 106. However, when the power supply apparatus 100 is supplying the second power to the electronic device 200, the power supply apparatus 100 cannot perform wireless communication conforming to the NFC standard with the electronic device 200 via the power transmitting antenna 106.

The matching circuit 104 is a resonance circuit for causing a resonance between the power transmitting antenna 106 and a power receiving antenna included in an apparatus corresponding to the power supply apparatus 100, according to the frequency oscillated by the oscillator 102. The matching circuit 104 is also a circuit for performing impedance matching between the power generation unit 103 and the power transmitting antenna 106. The matching circuit 104 includes a capacitor, a coil, a resistor, and so on. The CPU 107 can control a resonant frequency f of the power supply apparatus 100 by controlling the capacitor and coil included in the matching circuit 104. The resonant frequency f is used to cause a resonance between the power supply apparatus 100 and an apparatus subjected to power supply from the power supply apparatus 100.

The resonant frequency f is represented by the following formula (1), where L indicates the inductance of the matching circuit 104, and C indicates the capacitance of the matching circuit 104.

[Formula 1]

$$f = \frac{1}{2\pi\sqrt{LC}} \quad (1)$$

The resonant frequency f may be a commercial frequency (50/60 Hz), 10 to several tens MHz, or 13.56 MHz. The resonant frequency f may also be 6.78 MHz.

The matching circuit 104 can also detect a change of the current flowing to the power transmitting antenna 106. The matching circuit 104 can also detect a change of the voltage supplied to the power transmitting antenna 106.

In a state where the frequency oscillated by the oscillator 102 is set to the resonant frequency f, the power generated by the power generation unit 103 is supplied to the power transmitting antenna 106 via the matching circuit 104.

The modulation and demodulation circuit 105 is used for performing wireless communication conforming to the NFC standard between the power supply apparatus 100 and the electronic device 200. When the power supply apparatus 100 transmits to the electronic device 200 control data (hereinafter referred to as a command) for controlling the electronic device 200, the modulation and demodulation circuit 105 modulates the power generated by the power generation unit 103 based on a protocol conforming to the NFC standard.

The modulation and demodulation circuit 105 converts the power generated by the power generation unit 103 into a pulse signal through the amplitude shift keying (ASK) modulation utilizing the amplitude displacement. The pulse signal converted as a command is transmitted to the electronic device 200 via the power transmitting antenna 106. When the pulse signal is transmitted to the electronic device 200, the electronic device 200 analyzes the pulse signal to detect bit data containing information "1" and "0". The ASK modulation is a modulation method utilizing the amplitude displacement, and is used for communication between an integrated circuit (IC) card and a card reader.

The modulation and demodulation circuit 105 further includes a coding circuit conforming to a predetermined coding method.

According to a change of the current flowing to the power transmitting antenna 106 detected by the matching circuit 104, the modulation and demodulation circuit 105 can demodulate, through the coding circuit, response data from the electronic device 200 corresponding to a command transmitted to the electronic device 200 and control data from the electronic device 200. Thus, based on a load modulation method, the modulation and demodulation circuit 105 can receive from the electronic device 200 the response data corresponding to a command transmitted to the electronic device 200 and the control data transmitted from the electronic device 200.

The modulation and demodulation circuit 105 transmits a command to the electronic device 200 in response to an instruction from the CPU 107. Upon reception of the response data and the control data from the electronic device 200, the modulation and demodulation circuit 105 demodulates the received response data and the control data and then supplies the data to the CPU 107.

The power transmitting antenna 106 is used for outputting to the outside the power generated by the power generation unit 103. The power supply apparatus 100 supplies the power to the electronic device 200 via the power transmitting antenna 106. The power supply apparatus 100 transmits a command to the electronic device 200 via the power transmitting antenna 106. In addition, the power supply apparatus 100 receives from the electronic device 200 via the power transmitting antenna 106 the control data and the response data corresponding to a command transmitted to the electronic device 200.

The CPU (Central Processing Unit) 107 executes a computer program stored in the ROM 108 to control the power supply apparatus 100. The CPU 107 controls the power generation unit 103 to control the power for supplying wirelessly to the electronic device 200.

The ROM 108 stores a computer program for controlling the power supply apparatus 100 and information such as parameters related to the power supply apparatus 100. The RAM 109 which is a rewritable memory records a computer program for controlling the power supply apparatus 100, information such as parameters related to the power supply apparatus 100, and data received from the electronic device 200 by the modulation and demodulation circuit 105.

The display unit 110 displays either video data supplied from the RAM 109 or video data supplied from the ROM 108.

The operation unit 111 provides a user interface for operating the power supply apparatus 100. The operation unit 111 includes a power button of the power supply apparatus 100 and a mode switching button of the power supply apparatus 100. Each button is formed of a switch, a touch panel, or the like. The CPU 107 controls the power supply apparatus 100 according to a user instruction input via the operation unit 111.

The reflected power detection circuit 112 detects information indicating an amplitude voltage V1 of a traveling wave of the power output by the power transmitting antenna 106. The reflected power detection circuit 112 detects information indicating an amplitude voltage V2 of a reflected wave of the power output by the power transmitting antenna 106. The information indicating the amplitude voltage V1 and the information indicating the amplitude voltage V2 detected by the reflected power detection circuit 112 are supplied to the CPU 107. The CPU 107 records in the RAM 109 the information indicating the amplitude voltage V1 and the information indicating the amplitude voltage V2 supplied from the reflected power detection circuit 112.

The CPU 107 obtains a voltage reflection coefficient ρ based on the amplitude voltage V1 of the traveling wave and the amplitude voltage V2 of the reflected wave. In addition, the CPU 107 calculates a voltage standing wave ratio (VSWR) based on the voltage reflection coefficient ρ.

The voltage standing wave ratio (VSWR) indicates a relation between the traveling wave of the power output from the power transmitting antenna 106 and the reflected wave of the power output from the power transmitting antenna 106. A value of the voltage standing wave ratio (VSWR) closer to 1 indicates lower reflected power, a smaller loss of the power supplied from the power supply apparatus 100 to an external electronic device, and higher power transmission efficiency.

The following formula (2) represents the voltage reflection coefficient ρ.

[Formula 2]

$$\rho = \frac{V2}{V1} \quad (2)$$

The following formula (3) represents the voltage standing wave ratio VSWR.

[Formula 3]

$$VSWR = \frac{1+\rho}{1-\rho} \quad (3)$$

Hereinbelow, the voltage standing wave ratio VSWR is referred to as "VSWR".

Based on the calculated VSWR, the CPU 107 determines whether the electronic device 200 is placed in the vicinity of the power supply apparatus 100.

An example of a configuration of the electronic device 200 will be described below with reference to FIG. 2. The electronic device 200 includes a power receiving antenna 201, a matching circuit 202, a rectifying and smoothing circuit 203, a modulation and demodulation circuit 204, a CPU 205, a ROM 206, a RAM 207, a current and voltage detection unit 208, a regulator 209, a charging control unit 210, and a battery 211. The electronic device 200 further includes a first switching unit 212, a connector 213, a detection unit 214, a current limiting unit 215, a second switching unit 216, and a communication unit 217.

The power receiving antenna 201 is used for receiving the power supplied from the power supply apparatus 100. The electronic device 200 receives the power from the power supply apparatus 100 via the power receiving antenna 201. The electronic device 200 performs communication conforming to the NFC standard with the power supply apparatus 100 via the power receiving antenna 201. Upon reception of a command from the power supply apparatus 100 via the power receiving antenna 201, the electronic device 200 transmits to the power supply apparatus 100 via the power receiving antenna 201 response data corresponding to the command received from the power supply apparatus 100.

The matching circuit 202 is a resonance circuit for performing impedance matching so that the power receiving antenna 201 resonates with the same frequency as the resonant frequency f of the power supply apparatus 100. Similar to the matching circuit 104, the matching circuit 202 includes a capacitor, a coil, a resistor, and so on. The matching circuit 202 controls the matching circuit 202 so that the power receiving antenna 201 resonates with the same frequency as the resonant frequency f of the power supply apparatus 100. The matching circuit 202 supplies the power received by the power receiving antenna 201 to the rectifying and smoothing circuit 203.

The rectifying and smoothing circuit 203 removes a command and noise from the power received by the power receiving antenna 201 to generate DC power. The rectifying and smoothing circuit 203 further supplies the generated DC power to the regulator 209 via the current and voltage detection unit 208 and the first switching unit 212. The rectifying and smoothing circuit 203 supplies to the modulation and demodulation circuit 204 the command removed from the power received by the power receiving antenna 201.

The modulation and demodulation circuit 204 analyzes the command supplied from the rectifying and smoothing circuit 203 according to a communication protocol corresponding to the power supply apparatus 100 and then supplies a result of the command analysis to the CPU 205. When the power supply apparatus 100 is supplying the first power to the electronic device 200, the CPU 205 controls the modulation and demodulation circuit 204 so that the load included in the modulation and demodulation circuit 204 is fluctuated to transmit to the power supply apparatus 100 the response data corresponding to the command. Variation in the load included in the modulation and demodulation circuit 204 causes a change of the current flowing to the power transmitting antenna 106. Thus, the power supply apparatus 100 detects a change of the current flowing to the power transmitting antenna 106 so as to receive the response data corresponding to the command transmitted from the electronic device 200.

The CPU 205 determines what type of command that the command received by the modulation and demodulation circuit 204 is based on the result of the analysis supplied from the modulation and demodulation circuit 204. The CPU 205 then controls the electronic device 200 to perform a process and an operation specified by a command code corresponding to the received command. The CPU 205 executes a computer program stored in the ROM 206 to control the electronic device 200.

The ROM 206 stores a computer program for controlling the electronic device 200. Information about the electronic device 200 is recorded in the ROM 206. The RAM 207 which is a rewritable memory records the computer program for controlling the electronic device 200 and data transmitted from the power supply apparatus 100.

The current and voltage detection unit 208 detects the voltage of the power supplied from the rectifying and smoothing circuit 203. Further, the current and voltage detection unit 208 detects the current of the power supplied from the rectifying and smoothing circuit 203. The current and voltage detection unit 208 supplies current information indicating the detected current and voltage information indicating the detected voltage to the CPU 205.

In response to an instruction from the CPU 205, the regulator 209 performs control to supply to the electronic device 200 any one of the power supplied from the rectifying and smoothing circuit 203, the power supplied from the battery 211, and the power supplied from the external apparatus 400 via the cable 300. When the battery 211 is being charged in the electronic device 200, the regulator 209 supplies to the electronic device 200 either the power supplied from the rectifying and smoothing circuit 203 or the power supplied from the external apparatus 400 via the cable 300.

When the power is supplied from the regulator 209, the charging control unit 210 controls charging of the battery 211. The battery 211 is detachably attached to the electronic device 200. The battery 211 is a rechargeable secondary battery, for example, a lithium ion battery. The battery 211 may be a battery other than a lithium ion battery.

The first switching unit 212 is used for supplying to the regulator 209 either the power supplied from the rectifying and smoothing circuit 203 or the power supplied from the external apparatus 400 via the cable 300. When the CPU 205 controls the first switching unit 212 so that the power supplied from the rectifying and smoothing circuit 203 is supplied to the regulator 209, the power supplied from the external apparatus 400 via the cable 300 is not supplied to the regulator 209. When the CPU 205 controls the first switching unit 212 so that the power supplied from the external apparatus 400 via the cable 300 is supplied to the regulator 209, the power supplied from the rectifying and smoothing circuit 203 is not supplied to the regulator 209. The CPU 205 can also control the first switching unit 212 not to supply to the regulator 209 the power supplied from the rectifying and smoothing circuit 203 and the power supplied from the external apparatus 400 via the cable 300.

The connector 213 is a connection terminal for connecting the cable 300. The connector 213 is provided with a virtual bus (VBUS) terminal, a ground (GND) terminal, a D+ terminal, and a D− terminal.

The detection unit 214 detects the potential of the D+ terminal and the potential of the D− terminal so as to detect the type of the power source of the external apparatus 400.

Types of power source specified in the Battery Charging Specification in the USB standard include a standard downstream port, a charging downstream port, and a dedicated charging port. The detection unit 214 detects whether the external apparatus 400 conforms to any one of the standard downstream port, the charging downstream port, and the dedicated charging port.

The standard downstream port can supply maximum 500 mA current to the electronic device 200. Hereinbelow, the standard downstream port is referred to as "SDP". The charging downstream port can supply maximum 1500 mA current to the electronic device 200. The charging downstream port is referred to as "CDP". The dedicated charging port can supply maximum 1500 mA current to the electronic device 200. The dedicated charging port is referred to as "DCP".

When the type of the power source of the external apparatus 400 is detected, the detection unit 214 notifies the CPU 205 of the type of the power source corresponding to the external apparatus 400. According to the USB standard applicable to the external apparatus 400, the detection unit 214 may detect the type of the power source corresponding to the external apparatus 400 by detecting how much current the external apparatus 400 can supply to the electronic device 200.

In a case where the connector 213 and the external apparatus 400 are connected via the cable 300, when the type of the power source corresponding to the external apparatus 400 is detected, the CPU 205 sets a flag f to ON. The flag f is data which indicates that the electronic device 200 can receive the power from the external apparatus 400. The flag f is recorded in the RAM 207. In a case where the connector 213 and the external apparatus 400 are not connected via the cable 300, the CPU 205 sets the flag f to OFF. In a case where the connector 213 and the external apparatus 400 are connected via the cable 300, when the type of the power source corresponding to the external apparatus 400 is not detected, the CPU 205 sets the flag f to OFF.

For example, when the external apparatus 400 is detected not to conform to the SDP, the CDP, and the DCP, even if the connector 213 and the external apparatus 400 are connected via the cable 300, the CPU 205 sets the flag f to OFF.

In a case where the external apparatus 400 and the connector 213 are connected via the cable 300, the current limiting unit 215 limits the current supplied from the VBUS terminal according to the type of the power source detected by the detection unit 214. For example, when the external apparatus 400 conforms to the SDP, the current limiting unit 215 performs control so that the current supplied from the VBUS terminal becomes 500 mA or less. For example, when the external apparatus 400 conforms to the CDP, the current limiting unit 215 performs control so that the current supplied from the VBUS terminal becomes 1500 mA or less. According to the type of the power source of the external apparatus 400, the current limiting unit 215 may perform control so that the current supplied from the VBUS terminal becomes 100 mA or less. The current controlled by the current limiting unit 215 is supplied to the regulator 209 via the first switching unit 212.

The second switching unit 216 is used for connecting the D+ and D− terminals of the connector 213 with either the communication unit 217 or the detection unit 214. If the mode of the electronic device 200 is either a mass storage device mode or an imaging device mode, the CPU 205 can control the second switching unit 216 to connect the D+ and D− terminals of the connector 213 with the communication unit 217. When the D+ and D− terminals of the connector 213 and the communication unit 217 are connected, the communication unit 217 can transmit data to the external apparatus 400 and receive data from the external apparatus 400 via the cable 300. When the D+ and D− terminals of the connector 213 and the communication unit 217 are connected, the D+ and D− terminals of the connector 213 and the detection unit 214 are assumed to be unconnected.

When the mode of the electronic device 200 is a human interface device (HID) mode, the CPU 205 can control the second switching unit 216 so as not to connect the D+ and D− terminals of the connector 213 and the communication unit 217. When the D+ and D− terminals of the connector 213 and the communication unit 217 are not connected, the communication unit 217 cannot transmit data to the external apparatus 400 or receive data from the external apparatus 400 via the cable 300. When the D+ and D− terminals of the connector 213 and the communication unit 217 are not connected, the D+ and D− terminals of the connector 213 and the detection unit 214 are assumed to be connected.

The communication unit 217 transmits data to the external apparatus 400 via the cable 300 and receives data supplied from the external apparatus 400 via the cable 300.

Figure 3:
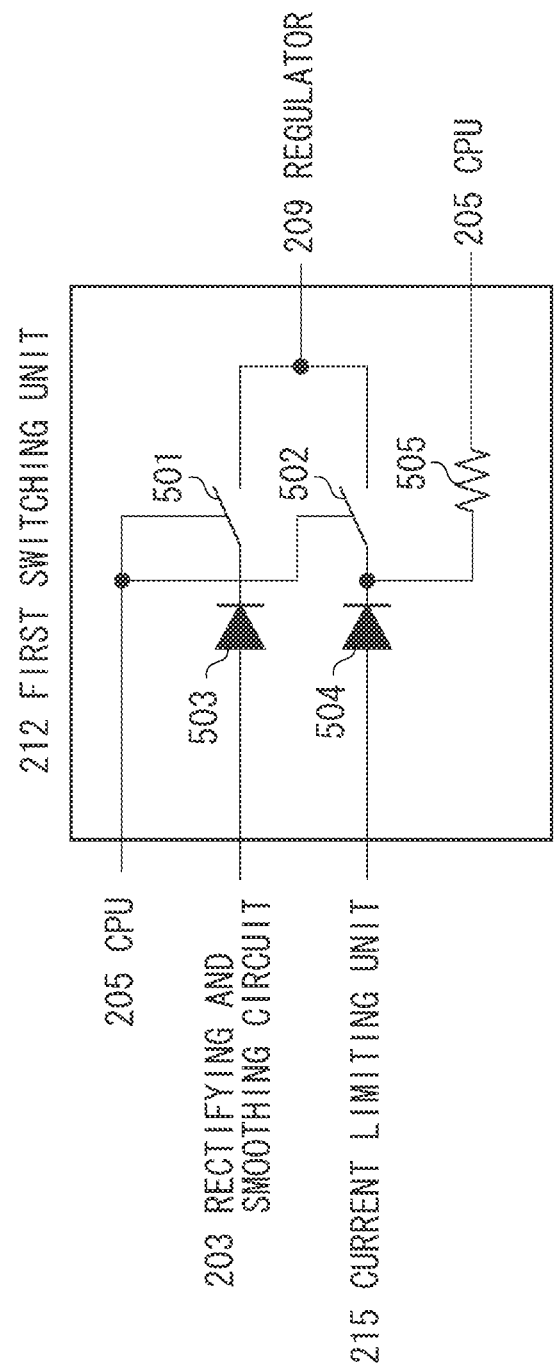
FIG. 3 illustrates an example of a configuration of a first switching unit of an electronic device according to the first exemplary embodiment.

FIG. 3 illustrates an example of a configuration of the first switching unit 212. The first switching unit 212 includes a switch 501, a switch 502, a diode 503, a diode 504, and a resistor 505.

Referring to FIG. 3, the rectifying and smoothing circuit 203 and the regulator 209 are connected via the diode 503 and the switch 501. The current limiting unit 215 and the regulator 209 are connected via the diode 504 and the switch 502.

The resistor 505 is connected between the diode 504 and the CPU 205. When the power is supplied from the external apparatus 400 to the electronic device 200 via the connector 213, a voltage is generated at the resistor 505. The CPU 205 can detect whether the power is supplied from the external apparatus 400 by detecting the voltage of the resistor 505.

The CPU 205 can select either the power supply apparatus 100 or the external apparatus 400 as an apparatus which supplies the power to the electronic device 200 by controlling the switches 501 and 502. When the switch 501 is turned ON and the switch 502 is turned OFF by the CPU 205, the power supply apparatus 100 is selected as an apparatus which supplies the power to the electronic device 200. When the switch 501 is turned OFF and the switch 502 is turned ON by the CPU 205, the external apparatus 400 is selected as an apparatus which supplies the power to the electronic device 200.

The power transmitting antenna 106 and the power receiving antenna 201 may be a helical antenna, a loop antenna, or a planar antenna such as a meander line antenna.

In the first exemplary embodiment, the process performed by the power supply apparatus 100 is also applicable to a system in which the power supply apparatus 100 wirelessly supplies the power to the electronic device 200 through electromagnetic field coupling. Further, in the first exemplary embodiment, the process performed by the power supply apparatus 100 is also applicable to a system in which, when an electrode is provided on the power supply apparatus 100 and an electrode is provided on the electronic device 200, the power supply apparatus 100 wirelessly supplies the power to the electronic device 200 through electric field coupling. Further, in the first exemplary embodiment, the process performed by the power supply apparatus 100 is also applicable to a system in which the power supply apparatus 100 wirelessly supplies the power to the electronic device 200 through electromagnetic induction.

Further, in the first exemplary embodiment, the power supply apparatus 100 wirelessly outputs the power to the electronic device 200, and the electronic device 200 wirelessly receives the power from the power supply apparatus 100. However, the term "wireless" may be replaced by "non-contact" or "contactless".

The electronic device 200 illustrated in FIG. 1 is supplies power wirelessly from the power supply apparatus 100 and supplied from the external apparatus 400 via the cable 300. In such a case, the power supply apparatus 100 needs to select either the power supply apparatus 100 or the external apparatus 400 as an apparatus which supplies the power to the electronic device 200. Therefore, the power supply apparatus 100 performs a selection process for selecting an apparatus which supplies the power to the electronic device 200.

(Selection Process)

The selection process performed by the power supply apparatus 100 according to the first exemplary embodiment will be described below with reference to the flowchart in FIG. 4. The selection process can be implemented when the CPU 107 executes a computer program stored in the ROM 108.

The CPU 107 controls the oscillator 102, the power generation unit 103, and the matching circuit 104 to output the first power via the power transmitting antenna 106 so as to detect whether the electronic device 200 exists within the predetermined range of distance. In this case, the CPU 107 monitors a change of the VSWR and, based on a change of the VSWR, detects whether the electronic device 200 exists within the predetermined range.

In step S401, the CPU 107 detects whether the electronic device 200 exists within the predetermined range. When a change of the VSWR is equal to or larger than a predetermined value A, the CPU 107 determines that the electronic device 200 is exists within the predetermined range. When a change of the VSWR is less than the predetermined value A, the CPU 107 determines that the electronic device 200 does not exist within the predetermined range. When the CPU 107 determines that the electronic device 200 exists within the predetermined range (YES in step S401), the process proceeds from step S401 to step S402. When the CPU 107 determines that the electronic device 200 does not exist within the predetermined range (NO in step S401), the process proceeds from step S401 to step S405. The predetermined value A may be set so that the CPU 107 can detect that at least one electronic device is placed in the vicinity of the power supply apparatus 100.

In step S402, the CPU 107 determines whether a plurality of electronic devices exist within the predetermined range. For example, in a case where the electronic device 200 and an electronic device other than the electronic device 200 exist within the predetermined range, the CPU 107 determines that a plurality of electronic devices exist within the predetermined range. When the CPU 107 determines that a plurality of electronic devices exists within the predetermined range of distance (YES in step S402), the process proceeds from step S402 to step S404. When the CPU 107 determines that a plurality of electronic devices does not exist within the predetermined range (NO in step S402), the CPU 107 determines that one unit of the electronic device 200 exists within the predetermined range. In this case (NO in step S402), the process proceeds from step S402 to step S403.

In step S403, the CPU 107 determines whether the electronic device 200 is in a state enabling to receive the power from the external apparatus 400.

The CPU 107 performs wireless communication conforming to the NFC standard to transmit to the electronic device 200 a first command for determining whether the electronic device 200 can receives the power from the external apparatus 400. Upon reception of the first command from the power supply apparatus 100, the electronic device 200 detects whether the flag f recorded in the RAM 207 is set to ON.

If the flag f recorded in the RAM 207 is set to ON, the electronic device 200 transmits to the power supply apparatus 100 response data indicating that the electric device 200 is in a state enabling to receive the power from the external apparatus 400. If the flag f recorded in the RAM 207 is set to OFF, the electronic device 200 transmits to the power supply apparatus 100 response data indicating that the electric device 200 is not in a state enabling to receive the power from the external apparatus 400. According to the response data corresponding to the first command, the CPU 107 determines whether the electronic device 200 is in a state enabling to receive the power from the external apparatus 400. The electronic device 200 can receive the power from the external apparatus 400 if the electronic device 200 is in a state enabling to receive the power from the external apparatus 400. The electronic device 200 cannot receive the power from the external apparatus 400 if the electronic device 200 is not in a state enabling to receive the power from the external apparatus 400.

When the CPU 107 determines that the electronic device 200 is in a state enabling to receive the power from the external apparatus 400 (YES in step S403), the process proceeds from step S403 to step S404. When the CPU 107 determines that the electronic device 200 is not in a state enabling to receive the power from the external apparatus 400 (NO in step S403), the process proceeds from step S403 to step S406.

In step S404, the CPU 107 performs wireless communication conforming to the NFC standard to transmit a second command to the electronic device 200. The second command is used for instructing the electronic device 200 so as to select the external apparatus 400 as an apparatus which supplies the power to the electronic device 200.

Upon reception of the second command from the power supply apparatus 100, the CPU 205 controls the first switching unit 212 so that the power is supplied to the regulator 209 from the external apparatus 400. In this case, the CPU 205 performs control so that the switch 501 is set to OFF and the switch 502 is set to ON. In this case, the external apparatus 400 supplies the power to the regulator 209, and the regulator 209 supplies to the electronic device 200 the power supplied from the external apparatus 400. When the battery 211 is not fully charged, the charging control unit 210 charges the battery 211 with the power supplied from the external apparatus 400 via the regulator 209.

When the first switching unit 212 is controlled so that the power supplied from the external apparatus 400 is supplied to the regulator 209, the electronic device 200 transmits response data corresponding to the second command to the power supply apparatus 100. When the second command is transmitted to the electronic device 200, the process proceeds from step S404 to step S405.

In step S405, the CPU 107 controls the oscillator 102, the power generation unit 103, and the matching circuit 104 not to output the power via the power transmitting antenna 106. In this case, the process in the flowchart in FIG. 4 is ended.

In step S406, the CPU 107 performs wireless communication conforming to the NFC standard to transmit a third command to the electronic device 200. The third command is used for instructing the electronic device 200 so as to select the power supply apparatus 100 as an apparatus which supplies the power to the electronic device 200.

Upon reception of the third command from the power supply apparatus 100, the CPU 205 controls the first switching unit 212 so that the power received from the power supply apparatus 100 via the power receiving antenna 201 is supplied to the regulator 209. In this case, the CPU 205 performs control to turn ON the switch 501 and turn OFF the switch 502. In this case, the power received by the electronic device 200 from the power supply apparatus 100 is supplied to the regulator 209. The regulator 209 supplies power to the electronic device 200 from the power supply apparatus 100. If the battery 211 is not fully charged, the charging control unit 210 charges the battery 211 with the power supplied from the power supply apparatus 100 via the regulator 209.

When the first switching unit 212 is controlled so that the power is supplied to the regulator 209 from the power supply apparatus 100, the electronic device 200 transmits response data corresponding to the third command to the power supply apparatus 100. When the third command is transmitted to the electronic device 200, the process proceeds from step S406 to step S407.

In step S407, the CPU 107 controls the oscillator 102, the power generation unit 103, and the matching circuit 104 to output the second power via the power transmitting antenna 106. Then, the process proceeds from step S407 to step S408.

In step S408, the CPU 107 detects whether a change of the VSWR is equal to or larger than the predetermined value A. When the CPU 107 determines that a change of the VSWR is equal to or larger than the predetermined value A (YES in step S408), the process proceeds from step S408 to step S409. When the CPU 107 determines that a change of the VSWR is less than the predetermined value A (NO in step S408), the process proceeds from step S408 to step S411.

In step S409, the CPU 107 detects whether one or more electronic devices exist within the predetermined range. When one or more electronic devices exist within the predetermined range (YES in step S409), the process proceeds from step S409 to step S410. When one or more electronic devices are not exist within the predetermined range (NO in step S409), the CPU 107 determines that no electronic device exists within the predetermined range of distance. In this case (NO in step S409), the process proceeds from step S409 to step S405.

In step S410, similar to the process in step S405, the CPU 107 controls the oscillator 102, the power generation unit 103, and the matching circuit 104 not to output the power via the power transmitting antenna 106. Then, the process returns from step S410 to step S402.

In step S411, the CPU 107 determines whether power supply is to be ended. For example, in step S406, if the CPU 107 detects that no electronic device which the third command was transmitted from the power supply apparatus 100 exists within the predetermined range to, the CPU 107 determines that power supply is to be ended.

For example, in step S406, if the CPU 107 detects that charging performed by the electronic device to which the third command was transmitted from the power supply apparatus 100 is stopped, the CPU 107 determines that power supply is to be ended. When the CPU 107 determines that power supply is to be ended (YES in step S411), the process proceeds from step S411 to step S405. When the CPU 107 determines that power supply is not to be ended (NO in step S411), the process returns from step S411 to step S408. When the CPU 107 determines that power supply is not to be ended (NO in step S411), the power supply apparatus 100 continuously supplies the power.

When the CPU 107 determines that a plurality of electronic devices exist within the predetermined range (YES in step S402), then in step S404, the CPU 107 transmits the second command to the plurality of electronic devices existing within the predetermined range.

Thus, the power supply apparatus 100 according to the first exemplary embodiment selects an apparatus capable of suitably supplying the power to the electronic device 200.

When a plurality of electronic devices exists within the predetermined range (YES in step S402), the power supply apparatus 100 selects the external apparatus 400. When a plurality of electronic devices exists within the predetermined range, the power supply apparatus 100 supplies the power in parallel to the plurality of electronic devices. In this case, the power supplied from the power supply apparatus 100 to each electronic device is lower than that in a case where the power supply apparatus 100 supplies the power to one electronic device. This means that the electronic device 200 cannot efficiently receive the power from the power supply apparatus 100. Therefore, in a case where a plurality of electronic devices exists within the predetermined range, the power supply apparatus 100 enables the plurality of electronic devices to receive the power from the external apparatus 400.

When the electronic device 200 can receive the power from the external apparatus 400 (YES in step S403), the power supply apparatus 100 selects the external apparatus 400. When the power supply apparatus 100 supplies the power to the electronic device 200, the power received by the electronic device 200 from the power supply apparatus 100 is affected by a state of the electronic device 200 and an operating state of the power supply apparatus 100. Thus, the external apparatus 400 is sometimes able to supply to the electronic device 200 more stable power than the power supply apparatus 100. Therefore, when the electronic device 200 can receive the power from the external apparatus 400 (YES in step S403), the power supply apparatus 100 enables the electronic device 200 to receive the power from the external apparatus 400.

When the electronic device 200 cannot receive the power from the external apparatus 400 (NO in step S403), the power supply apparatus 100 selects the power supply apparatus 100. In this case, the power supply apparatus 100 enables the electronic device 200 to receive the power from the power supply apparatus 100.

When a change of the VSWR is equal to or larger than the predetermined value A (YES in step S408), the power supply apparatus 100 detects whether one or more electronic devices exists within the predetermined range. When a change of the VSWR is equal to or larger than the predetermined value A (YES in step S408), the number of the electronic devices existing within the predetermined range may have changed. In this case, when one or more electronic devices exists within the predetermined range (YES in step S409), the CPU 107 once stops output of the power and then reselects either the power supply apparatus 100 or the external apparatus 400. Therefore, according to a change of the number of electronic devices existing within the predetermined range, the power supply apparatus 100 can reselect an apparatus capable of suitably supplying the power to the electronic device 200.

Therefore, the power supply apparatus 100 can select an apparatus capable of supplying suitable power to the electronic device 200.

A second exemplary embodiment according to the present invention will be described below. In the second exemplary embodiment, for similar configurations, processes, and operations to the first exemplary embodiment, redundant description will be omitted.

(Selection Process)

A selection process performed by the power supply apparatus 100 according to the second exemplary embodiment will be described below with reference to the flowchart in FIG. 5. The selection process in FIG. 5 can be implemented when the CPU 107 executes a computer program stored in the ROM 108.

For the process similar to the selection process described in the first exemplary embodiment, redundant description will be omitted. Only different processes will be described below.

In step S501 and steps S505 to S512, the processes common to step S401 and steps S404 to S411 are performed, thus redundant description will be omitted.

In step S502, the CPU 107 determines whether a plurality of electronic devices exist within the predetermined range. When the CPU 107 determines that a plurality of electronic devices exists within the predetermined range (YES in step S502), the process proceeds from step S502 to step S513. When the CPU 107 determines that a plurality of electronic devices does not exist within the predetermined range (NO in step S502), the process proceeds from step S502 to step S503.

In step S503, the CPU 107 determines whether the electronic device 200 is in a state enabling to for receive the power from the external apparatus 400. When the CPU 107 determines that the electronic device 200 is in a state enabling to for receive the power from the external apparatus 400 (YES in step S503), the process proceeds from step S503 to step S504. When the CPU 107 determines that the electronic device 200 is not in a state enabling to receive the power from the external apparatus 400 (NO in step S503), the process proceeds from step S503 to step S507.

In step S504, the CPU 107 determines which of the power supply apparatus 100 and the external apparatus 400 can supply larger power to the electronic device 200.

In this case, the CPU 107 performs wireless communication conforming to the NFC standard to transmit a fourth command to the electronic device 200. The fourth command is used for requesting information indicating the power received by the electronic device 200 from the power supply apparatus 100. Upon reception of the fourth command from the power supply apparatus 100, the electronic device 200 detects first power information indicating the power received by the electronic device 200 from the power supply apparatus 100, using the current information and the voltage information supplied from the current and voltage detection unit 208. In this case, the electronic device 200 transmits response data including the first power information to the power supply apparatus 100.

The CPU 107 performs wireless communication conforming to the NFC standard to transmit a fifth command to the electronic device 200. The fifth command is used for requesting information indicating the power supplied from the external apparatus 400 to the electronic device 200. Upon reception of the fifth command from the power supply apparatus 100, the electronic device 200 detects second power information indicating the power supplied from the external apparatus 400 to the electronic device 200, using the information indicating the current supplied from the current limiting unit 215. In this case, the electronic device 200 transmits response data including the second power information to the power supply apparatus 100.

When the first power information and the second power information are obtained from the electronic device 200, the CPU 107 compares the power received by the electronic device 200 from the power supply apparatus 100 with the power supplied from the external apparatus 400 to the electronic device 200, using the first power information and the second power information.

When the CPU 107 determines that the power received by the electronic device 200 from the power supply apparatus 100 is larger than the power supplied from the external apparatus 400 to the electronic device 200 (YES in step S504), the process proceeds from step S504 to step S507. When the CPU 107 determines that the power received by the electronic device 200 from the power supply apparatus 100 is not larger than the power supplied from the external apparatus 400 to the electronic device 200 (NO in step S504), the process proceeds from step S504 to step S505.

In step S513, the CPU 107 performs an exception process described below. After completion of the exception process, the process in the flowchart in FIG. 5 is ended.

Although, in step S504, the CPU 107 compares the power received by the electronic device 200 from the power supply apparatus 100 with the power supplied from the external apparatus 400 to the electronic device 200, the process is not limited thereto. For example, in step S504, the CPU 107 may compare the power output from the power transmitting antenna 106, instead of the power received by the electronic device 200 from the power supply apparatus 100, with the power supplied from the external apparatus 400 to the electronic device 200.

The exception process in step S513 performed in the selection process in FIG. 5 according to the second exemplary embodiment will be described below with reference to a flowchart in FIG. 6. The exception process illustrated in FIG. 6 can be implemented when the CPU 107 executes a computer program stored in the ROM 108.

The CPU 107 performs the exception process in step S513 when it is determined that a plurality of electronic devices exists within the predetermined range (YES in step S502). The exception process in step S513 is performed in a case where the electronic device 200 and an electronic device 500 exist within the predetermined range, as illustrated in FIG. 7.

Figure 7:
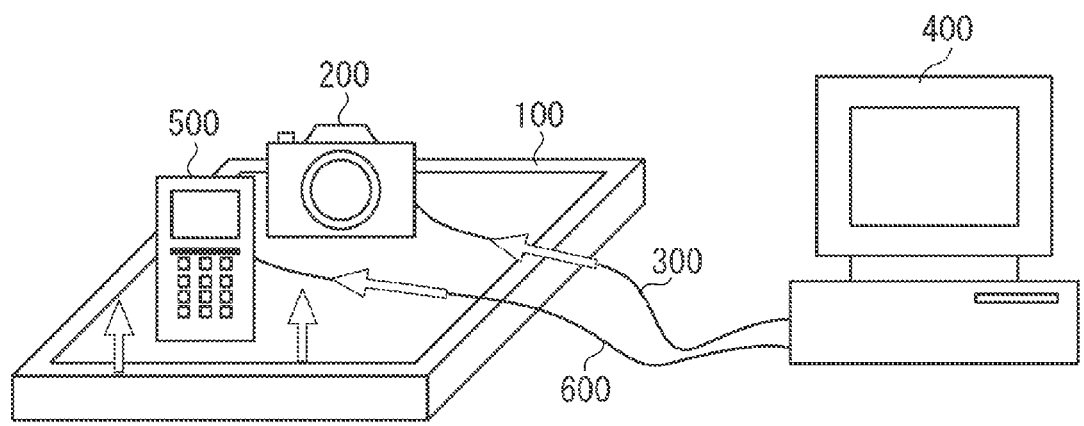
FIG. 7 illustrates an example of a power supply system according to the second exemplary embodiment.

The exception process in a power supply system as illustrated in FIG. 7 will be described below as an example. In this case, it is assumed that the electronic device 500 has a similar configuration to the electronic device 200. Further, the electronic device 500 may be connected to the external apparatus 400 via a cable 600, as illustrated in FIG. 7. The cable 600 also has a similar configuration to the cable 300. Further, the electronic device 500 is supplied power from the external apparatus 400 via the cable 600. If the CPU 107 determines that the electronic device 200 and the electronic device 500 exist within the predetermined range, the CPU 107 performs a process of step S601.

In step S601, the CPU 107 determines whether the electronic device 200 and the electronic device 500 are in a state enabling to receive the power from the external apparatus 400.

When the CPU 107 determines that the electronic device 200 and the electronic device 500 are in a state enabling to receive the power from the external apparatus 400 (YES in step S601), the process proceeds from step S601 to step S602. When the CPU 107 determines that the electronic device 200 and the electronic device 500 are not in a state enabling to receive the power from the external apparatus 400 (NO in step S601), the CPU 107 determines that at least one of the electronic device 200 and the electronic devices 500 cannot receive power from the external apparatus 400. In this case, (NO in step S601), the process proceeds from step S601 to step S603.

In step S602, the CPU 107 performs wireless communication conforming to the NFC standard to transmit the second command to the electronic device 200 and the electronic device 500. When the electronic device 200 receives the second command from the power supply apparatus 100, the electronic device 200 supplies power to the electronic device 200 from the external apparatus 400. Further, the electronic device 200 prevents power from supplying from the power supply apparatus 100 to the electronic device 200. When the electronic device 500 receives the second command from the power supply apparatus 100, the electronic device 500 supplies to the electronic device 500 from the external apparatus 400. Further, the electronic device 500 and prevents power from supplying from the power supply apparatus 100 to the electronic device 500. In this case, the process proceeds from step S602 to step S506.

In step S603, the CPU 107 determines whether an apparatus which cannot receive the power from the external apparatus 400 is either the electronic device 200 or the electronic devices 500. When the CPU 107 determines that the apparatus which cannot receive the power from the external apparatus 400 is either the electronic device 200 or the electronic devices 500 (YES in step S603), the process proceeds from step S603 to step S604. When the CPU 107 determines that the apparatus which cannot receive the power from the external apparatus 400 is not either the electronic device 200 or the electronic devices 500 (NO in step S603), the electronic device 200 and the electronic device 500 cannot receive the power from the external apparatus 400. In this case, (NO in step S603), the process proceeds from step S603 to step S606.

In step S604, the CPU 107 performs wireless communication conforming to the NFC standard to transmit the third command to an electronic device determined to be unable to receive the power from the external apparatus 400.

For example, when the electronic device 200 receives the third command from the power supply apparatus 100, the electronic device 200 prevents power from supplying from the external apparatus 400 to the electronic device 200. Further, the electronic device 200 supplies power to the electronic device 200 from the power supply apparatus 100. Further, for example, when the electronic device 500 receives the third command from the power supply apparatus 100, the electronic device 500 prevents power from supplying from the external apparatus 400 to the electronic device 500. Further, the electronic device 500 supplies power to the electronic device 500 from the power supply apparatus 100. In this case, the process proceeds from step S604 to step S605.

In step S605, the CPU 107 performs wireless communication conforming to the NFC standard to transmit the second command to an electronic device other than the electronic device to which the third command was transmitted in step S604. In this case, the process proceeds from step S605 to step S508.

In step S606, the CPU 107 compares an efficiency of power transmission from the power supply apparatus 100 to the electronic device 200 with an efficiency of power transmission from the power supply apparatus 100 to the electronic device 500.

The CPU 107 detects first efficiency information indicating the efficiency of power transmission from the power supply apparatus 100 to the electronic device 200 and second efficiency information indicating the efficiency of power transmission from the power supply apparatus 100 to the electronic device 500. The CPU 107 compares the first efficiency information with the second efficiency information to determine which of the electronic device 200 and the electronic device 500 can efficiently receive the power from the power supply apparatus 100. In this case, the process proceeds from step S606 to step S607.

In step S607, the CPU 107 performs wireless communication conforming to the NFC standard to transmit the third command to an electronic device determined to be able to efficiently receive the power from the power supply apparatus 100.

When the efficiency of power transmission from the power supply apparatus 100 to the electronic device 200 is higher than the efficiency of power transmission from the power supply apparatus 100 to the electronic device 500, the CPU 107 transmits the third command to the electronic device 200. Otherwise, when the efficiency of power transmission from the power supply apparatus 100 to the electronic device 200 is lower than the efficiency of power transmission from the power supply apparatus 100 to the electronic device 500, the CPU 107 transmits the third command to the electronic device 500.

When the efficiency of power transmission from the power supply apparatus 100 to the electronic device 200 is equal to the efficiency of power transmission from the power supply apparatus 100 to the electronic device 500, the CPU 107 may transmit the third command to an apparatus first determined to exist within the predetermined range. Further, when the efficiency of power transmission from the power supply apparatus 100 to the electronic device 200 is equal to the efficiency of power transmission from the power supply apparatus 100 to the electronic device 500, the CPU 107 may transmit the third command to an apparatus having large power consumption. Further, when the efficiency of power transmission from the power supply apparatus 100 to the electronic device 200 is equal to the efficiency of power transmission from the power supply apparatus 100 to the electronic device 500, the CPU 107 may transmit the third command to an apparatus having smaller remaining capacity of the battery. In this case, the process proceeds from step S607 to step S608.

In step S608, the CPU 107 performs wireless communication conforming to the NFC standard to transmit the second command to an electronic device other than the electronic device to which the third command was transmitted in step S607. In this case, the process proceeds from step S608 to step S508.

Thus, based on the result of the comparison between the power received by the electronic device 200 from the power supply apparatus 100 and the power supplied from the external apparatus 400 to the electronic device 200, the power supply apparatus 100 according to the second exemplary embodiment selects an apparatus capable of suitably supplying the power to the electronic device 200.

When the power received by the electronic device 200 from the power supply apparatus 100 is larger than the power supplied from the external apparatus 400 to the electronic device 200 (YES in step S504), the CPU 107 selects the power supply apparatus 100. In this case, the power supply apparatus 100 can efficiently supply the power to the electronic device 200.

When the power received by the electronic device 200 from the power supply apparatus 100 is not larger than the power supplied from the external apparatus 400 to the electronic device 200 (NO in step S504), the CPU 107 selects the external apparatus 400. In this case, the power supply apparatus 100 enables efficient a supply of power from the external apparatus 400 to the electronic device 200. Further, in this case, if the power received by the electronic device 200 from the power supply apparatus 100 is equal to the power supplied from the external apparatus 400 to the electronic device 200, the CPU 107 selects the external apparatus 400. This is because it is likely that the external apparatus 400 can supply more stable power to the electronic device 200 than the power supply apparatus 100.

According to the second exemplary embodiment, when a plurality of electronic devices exists within the predetermined range (YES in step S502), the CPU 107 determines whether each electronic device is in a state enabling to receive the power from the external apparatus 400. Further, based on the result of the determination, the CPU 107 selects an apparatus capable of suitably supplying the power to each electronic device.

Therefore, if a plurality of electronic devices exists within the predetermined range of distance, the power supply apparatus 100 can select an apparatus capable of suitably supplying the power for each electronic device.

With the power supply apparatus 100 according to the second exemplary embodiment, portions common to the processes and configurations described in the first exemplary embodiment have similar effects to the first exemplary embodiment.

Although the power supplied from the external apparatus 400 via the cable 600 is supplied to the electronic device 500, the electronic device 500 may be supplied power from an apparatus other than the external apparatus 400 via the cable 600.

A third exemplary embodiment according to the present invention will be described below. In the third exemplary embodiment, for similar configurations, processes, and operations to the first and second exemplary embodiments, redundant description will be omitted.

Figure 8:
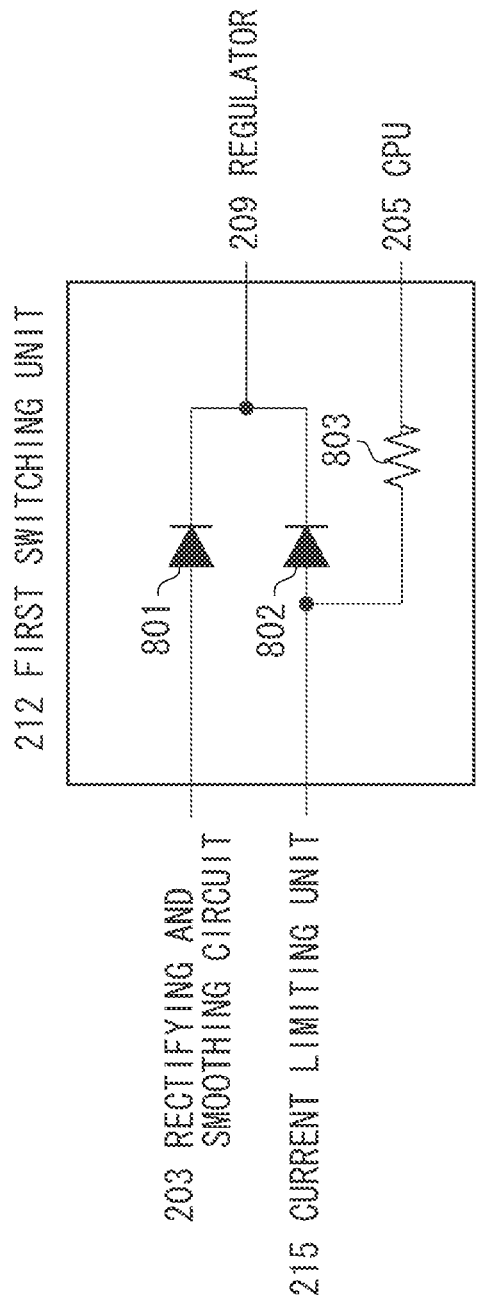
FIG. 8 illustrates an example of a configuration of a first switching unit of an electronic device according to a third exemplary embodiment.

The electronic device 200 according to the third exemplary embodiment includes a first switching unit 212 as illustrated in FIG. 8. The first switching unit 212 according to the third exemplary embodiment includes a diode 801, a diode 802, and a resistor 803.

Referring to FIG. 8, the rectifying and smoothing circuit 203 and the regulator 209 are connected via the diode 801, and the current limiting unit 215 and the regulator 209 are connected via the diode 802.

The resistor 803 is connected between the diode 802 and the CPU 205. When the power is supplied from the external apparatus 400 to the electronic device 200 via the connector 213, a voltage is generated at the resistor 803.

The CPU 205 can detect whether the power is supplied from the external apparatus 400 by detecting the voltage of the resistor 803. Whichever larger the power supplied from the power supply apparatus 100 to the electronic device 200 or the power supplied from the external apparatus 400 to the electronic device 200 is supplied to the regulator 209.

The CPU 205 detects a voltage level supplied from the power supply apparatus 100 using the voltage information supplied from the current and voltage detection unit 208. The CPU 205 detects a voltage level supplied from the external apparatus 400 using the voltage information obtained by detecting the voltage of the resistor 803. The voltage level supplied from the power supply apparatus 100 is referred to as a first voltage level, and the voltage level supplied from the external apparatus 400 is referred to as a second voltage level.

Figure 5:
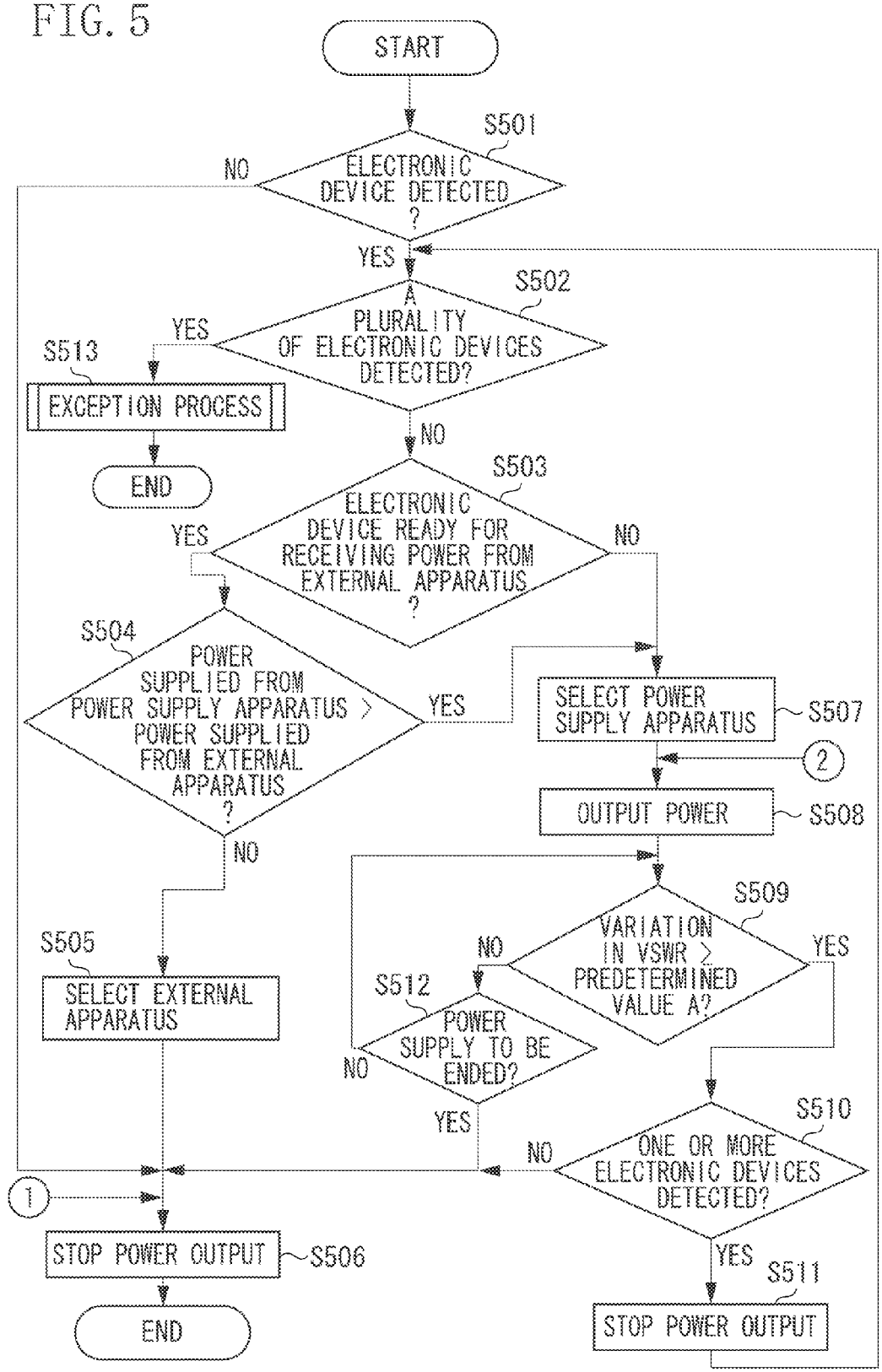
FIG. 5 is a flowchart illustrating an example of a selection process performed by a power supply apparatus according to a second exemplary embodiment.
Figure 6:
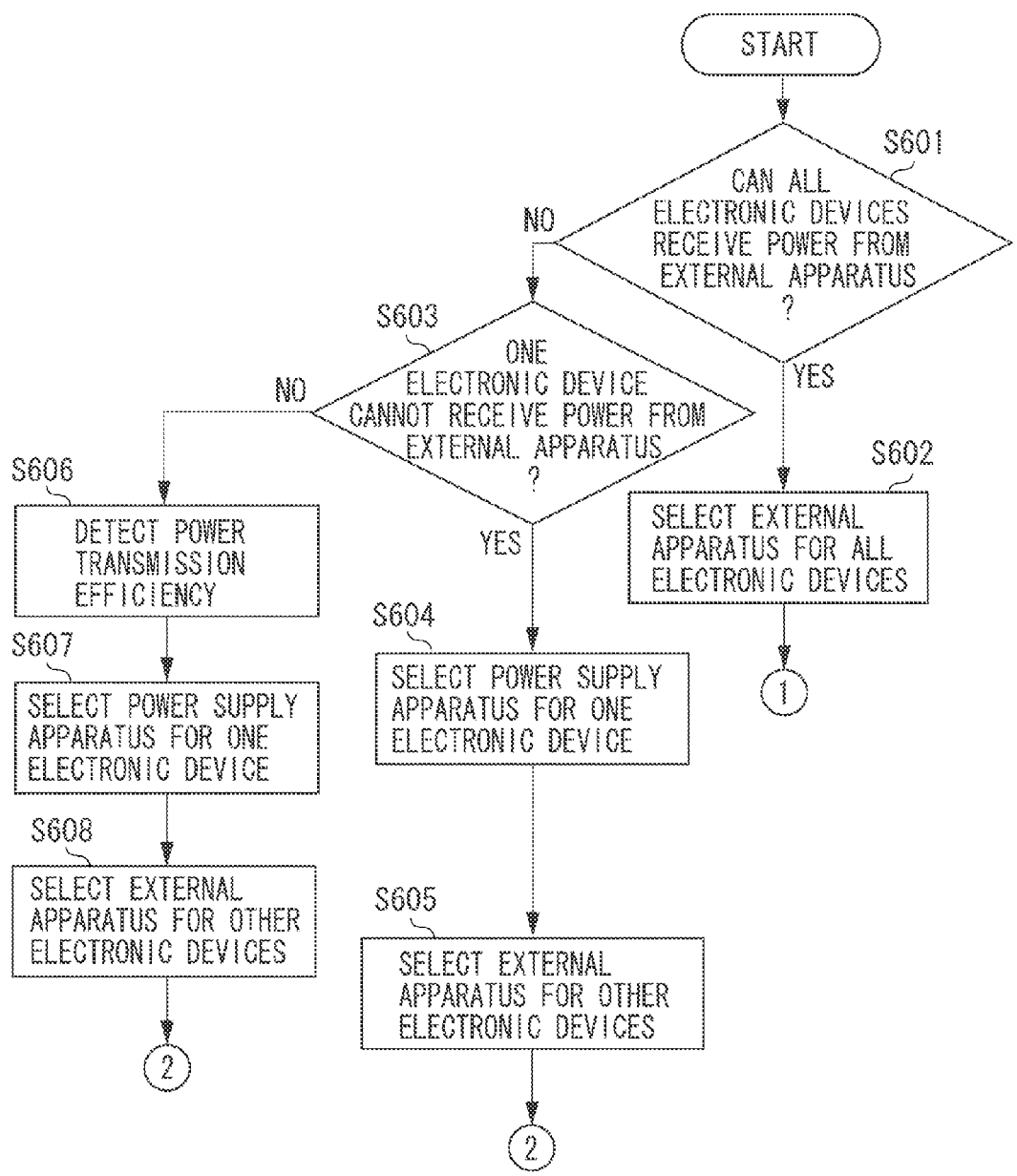
FIG. 6 is a flowchart illustrating an example of an exception process performed by the power supply apparatus according to the second exemplary embodiment.

According to the third exemplary embodiment, the CPU 107 performs the selection process in FIG. 5. When performing the process in step S504, the CPU 107 may, by comparing the first voltage level with the second voltage level, determine which of the power supply apparatus 100 and the external apparatus 400 can supply larger power to the electronic device 200.

In this case, the CPU 107 performs wireless communication conforming to the NFC standard to transmit to the electronic device 200 a sixth command for requesting the first voltage level. Upon reception of the sixth command from the power supply apparatus 100, the electronic device 200 detects the first voltage level. The electronic device 200 transmits response data including the first voltage level to the power supply apparatus 100.

The CPU 107 performs wireless communication conforming to the NFC standard to transmit to the electronic device 200 for requesting the second voltage level. Upon reception of the seventh command from the power supply apparatus 100, the electronic device 200 detects the second voltage level. The electronic device 200 transmits response data including the second voltage level to the power supply apparatus 100.

When the first voltage level and the second voltage level are obtained from the electronic device 200, the CPU 107 compares the first voltage level with the second voltage level. When the CPU 107 determines that the first voltage level is larger than the second voltage level (YES in step S504), the process proceeds from step S504 to step S507. When the CPU 107 determines that the first voltage level is not larger than the second voltage level (NO in step S504), the process proceeds from step S504 to step S505.

With the power supply apparatus 100 according to the third exemplary embodiment, portions common to the processes and configurations described in the first and second exemplary embodiments have similar effects to the first and second exemplary embodiments.

Although, according to the first, second, and third exemplary embodiments, the power supply apparatus 100 performs wireless communication conforming to the NFC standard, the process is not limited thereto. For example, the power supply apparatus 100 may perform wireless communication conforming to the International Organization for Standardization/International Electrotechnical Commission (ISO/IEC) 18092 standard, such as the Radio Frequency Identification (RFID) standard or the Transfer Jet (registered trademark) standard. Further, for example, the power supply apparatus 100 may perform wireless communication conforming to the Mikron Fare-collection System (MIFARE) (registered trademark) standard or the FeliCa (registered trademark) standard.

Although, according to the first, second, and third exemplary embodiments, the electronic device 200 can receive the power from the external apparatus 400 via the cable 300, the process is not limited thereto. For example, instead of the external apparatus 400 being connected to the electronic device 200 via the cable 300, a device which outputs the DC power from a commercial power supply may be connected to the electronic device 200. The device which outputs the DC power from a commercial power supply is, for example, an AC adapter. The cable 300 may conform to a standard other than the USB standard. Even in a case where an AC adapter is connected to the electronic device 200, the power supply apparatus 100 may perform the selection process in FIG. 4 and the selection process in FIG. 5 similar to a case where the external apparatus 400 is connected to the electronic device 200 via the cable 300.

According to the first, second, and third exemplary embodiments, the power supply apparatus 100 selects either the power supply apparatus 100 or the external apparatus 400 as an apparatus capable of suitably supplying the power to the electronic device 200.

Subsequently, when the CPU 107 detects that the state of connection between the electronic device 200 and the external apparatus 400 has changed, the power supply apparatus 100 may select again an apparatus capable of suitably supplying the power to the electronic device 200. In this case, for example, when the external apparatus 400 is selected by the power supply apparatus 100 as an apparatus which supplies the power to the electronic device 200 and then the electronic device 200 and the external apparatus 400 are disconnected, the power supply apparatus 100 may select again an apparatus capable of suitably supplying the power to the electronic device 200, by performing again the selection process in FIG. 4 or the selection process in FIG. 5.

Figure 4:
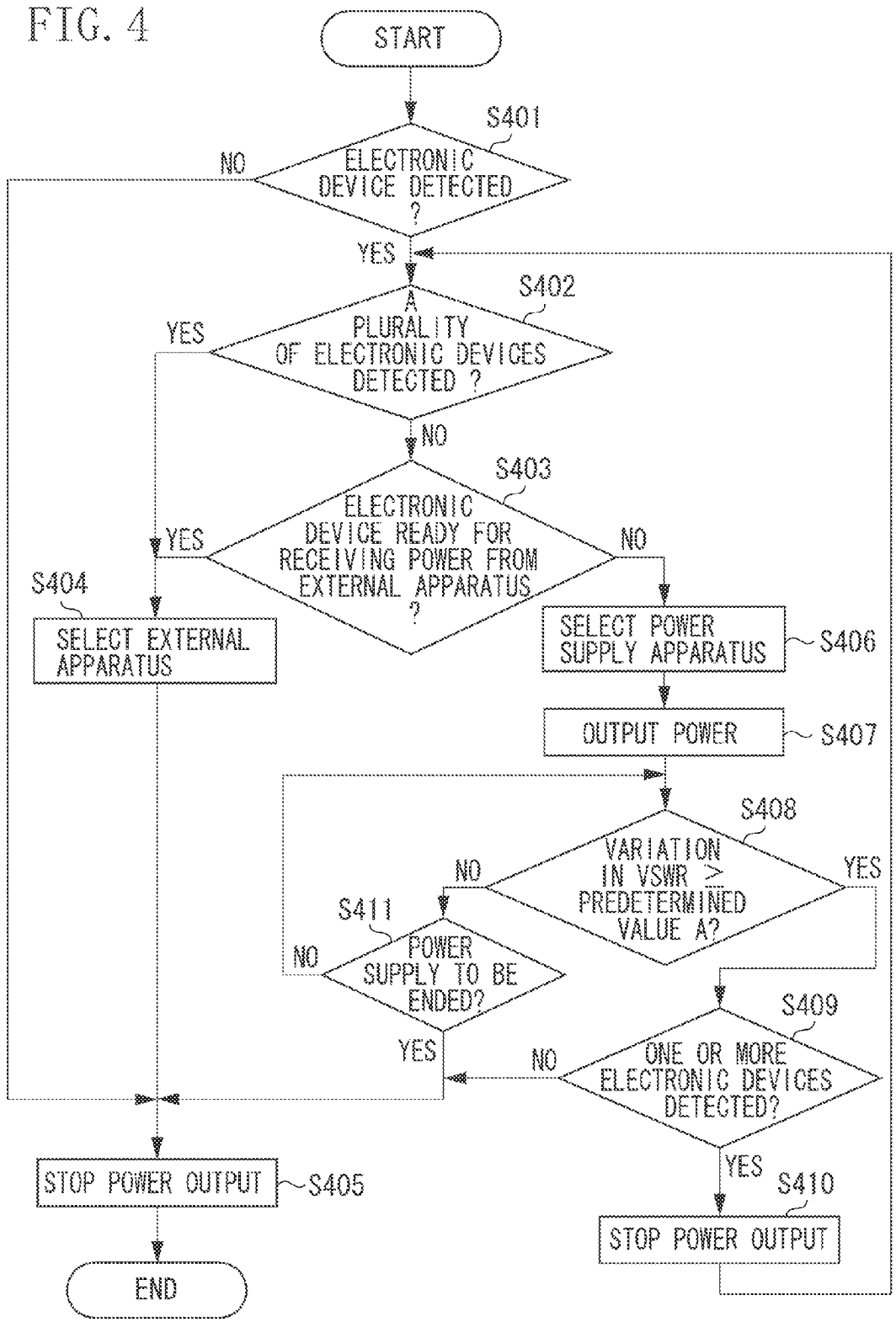
FIG. 4 is a flowchart illustrating an example of a selection process performed by a power supply apparatus according to the first exemplary embodiment.

Further, for example, when the power supply apparatus 100 is selected by the power supply apparatus 100 as an apparatus which supplies the power to the electronic device 200 and then the electronic device 200 and the external apparatus 400 are connected, the power supply apparatus 100 may select again an apparatus capable of suitably supplying the power to the electronic device 200, by performing again the selection process in FIG. 4 or the selection process in FIG. 5.

Further, when the power supply apparatus 100 detects that the power supplied from the external apparatus 400 to the electronic device 200 has changed, the power supply apparatus 100 may select again an apparatus capable of suitably supplying the power to the electronic device 200. In this case, for example, when the external apparatus 400 is selected by the power supply apparatus 100 as an apparatus which supplies the power to the electronic device 200 and then the power supplied from the external apparatus 400 to the electronic device 200 decreases, the power supply apparatus 100 may select again an apparatus capable of suitably supplying the power to the electronic device 200, by performing again the selection process in FIG. 4 or the selection process in FIG. 5.

Further, for example, when the power supply apparatus 100 is selected by the power supply apparatus 100 as an apparatus which supplies the power to the electronic device 200 and then the power supplied from the external apparatus 400 to the electronic device 200 increases, the power supply apparatus 100 may select again an apparatus capable of suitably supplying the power to the electronic device 200, by performing again the selection process in FIG. 4 or the selection process in FIG. 5.

If the power supply apparatus 100 stops power output in the process in step S405 or S506, the power supply apparatus 100 may continue wireless communication conforming to the NFC standard with the electronic device 200.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-020012 filed Feb. 1, 2012, which is hereby incorporated by reference herein in its entirety.

What is claimed is:

1. A power supply device comprising:
   a power supply unit that wirelessly supplies power;
   a communication unit that communicates with an electronic device different from the power supply device; and
   a control unit that controls the communication unit to transmit predetermined data to the electronic device based on whether or not the electronic device is in a state that enables the electronic device to receive power from an external device through a connection between the electronic device and the external device, the external device being different from the power supply device,
   wherein the predetermined data includes one of first data and a second data, the first data is used for causing the electronic device to receive power from the external device, and the second data is used for causing the electronic device to receive power from the power supply device, and
   wherein the external device includes a device for supplying power to the electronic device.

2. The power supply device according to claim 1, wherein the control unit that controls the communication unit to transmit the first data to the electronic device if the electronic device and the external device are connected.

3. The power supply device according to claim 2, wherein the control unit continues to communicate with the electronic device after the first data is transmitted to the electronic device.

4. The power supply device according to claim 1, wherein the control unit controls the communication unit to transmit the second data to the electronic device if the electronic device and the external device are not connected.

5. The power supply device according to claim 1, wherein the control unit controls the power supply unit to limit power for supplying to the electronic device if the electronic device and the external device are connected.

6. The power supply device according to claim 1, wherein the control unit controls the communication unit to transmit the predetermined data to the electronic device based on a first level and a second level if the electronic device and the external device are connected, and
wherein the first level indicates a level of power supplied from the power supply device to the electronic device, and the second level indicates a level of power supplied from the external device to the electronic device.

7. The power supply device according to claim 6, wherein the control unit controls the communication unit to transmit the second data to the electronic device if the first level is higher than the second level.

8. The power supply device according to claim 6, wherein the control unit controls the communication unit to transmit the first data to the electronic device if the first level is not higher than the second level.

9. The power supply device according to claim 1, wherein the control unit controls the power supply unit to supply predetermined power to the electronic device if the electronic device and the external device are not connected, and the predetermined power is used for charging a battery.

10. The power supply device according to claim 1, further comprising
a detection unit that detects one or more electronic devices, wherein, if the detection unit detects a plurality of electronic devices, the control unit controls the communication unit to transmit third command to the plurality of electronic devices, and wherein the third command is used for controlling not to receive power from the power supply device.

11. The power supply device according to claim 1, further comprising
a detection unit that detects one or more electronic devices, and wherein the control unit performs a process for controlling the communication unit to transmit the predetermined data if a number of electronic devices detected by the detection unit is changed.

12. The power supply device according to claim 1, wherein the external device is different from a battery.

13. The power supply device according to claim 1, wherein the external device includes an AC adapter.

14. The power supply device according to claim 1, wherein the external device includes a device that can supply power to the electronic device based on Universal Serial Bus (USB).

15. An electronic device comprising:
a connection unit that connects to an external device different from the electronic device;
a power receiving unit that wirelessly receives power from a power supply device different from the electronic device;
a communication unit that communicates with the power supply device; and
a control unit that controls the communication unit so as to transmit predetermined information to the power supply device,
wherein the predetermined information indicates whether or not the connection unit and the external device are connected to each other, a level of power received by the electronic device from the power supply device, and a level of power supplied to the electronic device by the external device, and
wherein the external device includes a device for supplying power to the electronic device via the connection unit.

16. A method for controlling a power supply device, the method comprising:
wirelessly supplying power;
communicating with an electronic device different from the power supply device; and
transmitting predetermined data to the electronic device based on whether or not the electronic device is in a state that enables the electronic device to receive power from an external device through a connection between the electronic device and the external device, the external device being different from the power supply device,
wherein the predetermined data includes one of first data and a second data, the first data is used for causing the electronic device to receive power from the external device, and the second data is used for causing the electronic device to receive power from the power supply device, and
wherein the external device includes a device for supplying power to the electronic device.

17. A method for controlling an electronic device, wherein the electronic device includes a connection unit that connects to an external device different from the electronic device, the method comprising:
wirelessly receiving power;
communicating with a power supply device different from the electronic device; and
transmitting predetermined information to the power supply device,
wherein the predetermined information indicates whether or not the connection unit and an external device are connected to each other, a level of power received by the electronic device from the power supply device, and a level of power supplied to the electronic device by the external device, and
wherein the external device includes a device for supplying power to the electronic device via the connection unit.

18. A recording medium recording a program for causing a computer to execute a method for controlling a power supply device, the method comprising:
wirelessly supplying power;
communicating with an electronic device different from the power supply device; and
transmitting predetermined data to the electronic device based on whether or not the electronic device is in a state that enables the electronic device to receive power from an external device through a connection between the electronic device and the external device, the external device being different from the power supply device,
wherein the predetermined data includes one of first data and a second data, the first data is used for causing the electronic device to receive power from the external device, and the second data is used for causing the electronic device to receive power from the power supply device, and
wherein the external device includes a device for supplying power to the electronic device.

19. A recording medium recording a program for causing a computer to execute a method for controlling an electronic device, wherein the electronic device includes a connection unit that connects to an external device different from the electronic device, the method comprising:
- wirelessly receiving power;
- communicating with a power supply device different from the electronic device; and
- transmitting predetermined information to the power supply device,
- wherein the predetermined information indicates whether or not the connection unit and an external device are connected to each other, a level of power received by the electronic device from the power supply device, and a level of power supplied to the electronic device by the external device, and
- wherein the external device includes a device for supplying power to the electronic device via the connection unit.

20. The power supply device according to claim 1,
- wherein the control unit that compares a level of power received from the power supply device to a level of power supplied by the external apparatus,
- wherein in response to the electronic device being in a state that enables the electronic device to receive power from and the external device and the level of power received from the power supply device being less than the level of power supplied by the external apparatus, the control unit selects the external apparatus to supply power to the electronic device, and
- wherein in response to either the electronic device not being in a state that enables the electronic device to receive power from the external device or the level of power received from the power supply device being greater than the level of power supplied by the external apparatus, the control unit selects the external apparatus to supply power to the electronic device.

* * * * *